(12) United States Patent
Yang et al.

(10) Patent No.: US 12,182,639 B2
(45) Date of Patent: Dec. 31, 2024

(54) RESOURCE MANAGEMENT METHOD AND COMPUTING SYSTEM

(71) Applicant: Hangzhou Jindoutengyun Technologies Co., Ltd., Zhejiang (CN)

(72) Inventors: Yang Yang, Hangzhou (CN); Jie Ding, Hangzhou (CN)

(73) Assignee: Hangzhou Jindoutengyun Technologies Co., Ltd., Hangzhou (CN)

( * ) Notice: Subject to any disclaimer, the term of this patent is extended or adjusted under 35 U.S.C. 154(b) by 0 days.

(21) Appl. No.: 18/192,647

(22) Filed: Mar. 30, 2023

(65) Prior Publication Data

US 2023/0315549 A1    Oct. 5, 2023

(30) Foreign Application Priority Data

Apr. 1, 2022  (CN) .......................... 202210337433.0

(51) Int. Cl.
*G06F 9/54* (2006.01)
*G06F 9/50* (2006.01)

(52) U.S. Cl.
CPC ............ *G06F 9/546* (2013.01); *G06F 9/5033* (2013.01)

(58) Field of Classification Search
CPC ............................... G06F 9/546; G06F 9/5033
See application file for complete search history.

(56) References Cited

U.S. PATENT DOCUMENTS

| | | | | |
|---|---|---|---|---|
| 2004/0034623 A1* | 2/2004 | Salmen | ............... | G06F 21/6218 |
| 2007/0226315 A1* | 9/2007 | Espelien | .............. | H04N 21/436 709/217 |
| 2009/0282020 A1* | 11/2009 | McSheffrey | ............ | G06F 16/41 707/999.005 |
| 2012/0226823 A1* | 9/2012 | Livnat | ................. | G06F 21/6209 709/246 |
| 2016/0062557 A1* | 3/2016 | Kim | ....................... | G06F 3/0481 715/781 |
| 2018/0253412 A1* | 9/2018 | Biswas | ............... | H04L 65/4015 |

FOREIGN PATENT DOCUMENTS

| | | |
|---|---|---|
| CN | 102760084 A | 10/2012 |
| CN | 103929442 A | 7/2014 |
| CN | 106790128 A | 5/2017 |
| CN | 106970978 A | 7/2017 |

* cited by examiner

*Primary Examiner* — Charles E Anya
(74) *Attorney, Agent, or Firm* — Proi Intellectual Property US

(57) ABSTRACT

Disclosed are a resource management method and a computing system. The resource management method comprises: creating a first user application resource library, and when a first user operates a first application, allowing the first application to access the first user application resource library; creating a third user application resource library, and when the first user operates a second application, allowing the second application to access the third user application resource library; and in response to a management operation performed by the first user on resources in the first user application resource library, directly or indirectly transmitting the resources in the first user application resource library to the third user application resource library. Independent resource libraries are configured according to applications operated by users, such that both resource isolation and resource sharing are realized.

12 Claims, 4 Drawing Sheets

RESOURCE MANAGEMENT METHOD AND COMPUTING SYSTEM

BACKGROUND OF THE INVENTION

1. Technical Field

The invention relates to a resource management method and a computing system.

2. Description of Related Art

According to existing systems (such as personal tablet computers or servers), users can access the same resources when operating different applications if any, and resources for different applications cannot be affectively isolated, so resource conflicts, leakages or virus infections occur easily.

BRIEF SUMMARY OF THE INVENTION

The objective of the invention is to solve the aforementioned problems by providing a resource management method, which configures independent resource libraries according to applications operated by users to realize resource isolation and resource sharing.

The invention further provides a computing system.

To fulfill the above objective, the invention is implemented through the following technical solution:

In one aspect, the invention provides a resource management method, which comprises:

Creating a first user application resource library, and when a first user operates a first application, allowing the first application to access the first user application resource library;

Creating a third user application resource library, and when the first user operates a second application, allowing the second application to access the third user application resource library; and In response to a management operation performed by the first user on resources in the first user application resource library, directly or indirectly transmitting the resources in the first user application resource library to the third user application resource library.

Preferably, in response to a management operation performed by the first user on resources in the first user application resource library, directly or indirectly transmitting the resources in the first user application resource library to the third user application resource library specifically comprises:

In response to a management operation performed by the first user on resources in the first user application resource library, transmitting the resources in the first user application resource library to a first user resource library; in response to a management operation performed by the first user on resources in the first user resource library, transmitting at least part of the resources received from the first user application resource library by the first user resource library to the third user application resource library; and Storing resources associated with the first user in the first user resource library to allow the first user to access the resources.

Preferably, the first user application resource library is created before the first user operates the first application, and is deleted after the first user finishes operating the first application; and the third user application resource library is created before the first user operates the second application, and is deleted after the first user finishes operating the second application.

Preferably, the resource management method further comprises:

Creating a second user application resource library, and when a second user operates the first application, allowing the first application to access the second user application resource library; and In response to a management operation performed by the first user on resources in the first user application resource library, directly or indirectly transmitting the resources in the first user application resource library to the second user application resource library.

Preferably, in response to a management operation performed by the first user on resources in the first user application resource library, directly or indirectly transmitting the resources in the first user application resource library to the second user application resource library specifically comprises:

In response to a management operation performed by the first user on resources in the first user application resource library, transmitting the resources in the first user application resource library to a second user resource library; in response to a management operation performed by the second user on resources in the second user resource library, transmitting at least part of resources received from the first user application resource library by the second user resource library to the second user application resource library;

Or, in response to a management operation performed by the first user on resources in the first user application resource library, transmitting the resources in the first user application resource library to a first user resource library; in response to a management operation performed by the first user on resources in the first user resource library, transmitting at least part of resources received from the first user application resource library by the first user resource library to a second user resource library; in response to a management operation performed by the second user on resources in the second user resource library, transmitting at least part of resources received from the first user resource library by the second user resource library to the second user application resource library; and Storing resources associated with the first user in the first user resource library to allow the first user to access the resources, and storing resources associated with the second user in the second user resource library to allow the second user to access the resources.

Preferably, the second user application resource library is created before the second user operates the first application, and is deleted after the second user finishes operating the first application.

Preferably, the resource management method further comprises:

Creating a fourth user application resource library, and when a second user operates the second application, allowing the second application to access the fourth user application resource library; and In response to a management operation performed by the first user on resources in the first user application resource library, directly or indirectly transmitting the resources in the first user application resource library to the fourth user application resource library.

Preferably, in response to a management operation performed by the first user on resources in the first user application resource library, directly or indirectly transmitting the resources in the first user application resource library to the fourth user application resource library specifically comprises:

In response to a management operation performed by the first user on resources in the first user application resource library, transmitting the resources in the first user application resource library to a second user resource library; in response to a management operation performed by the second user on the second user resource library, transmitting at least part of resources received from the first user application resource library by the second user resource library to the fourth user application resource library;

Or, in response to a management operation performed by the first user on resources in the first user application resource library, transmitting the resources in the first user application resource library to a first user resource library; in response to a management operation performed by the first user on resources in the first user resource library, transmitting at least part of resources received from the first user application resource library by the first user resource library to a second user resource library; in response to a management operation performed by the second user on the second user resource library, transmitting at least part of resources received from the first user resource library by the second user resource library to the fourth user application resource library; and Storing resources associated with the first user in the first user resource library to allow the first user to access the resources, and storing resources associated with the second user in the second user resource library to allow the second user to access the resources.

Preferably, the fourth user application resource library is created before the second user operates the second application, and is deleted after the second user finishes operating the second application.

Preferably, the management method further comprises:

Creating a first application resource library, and when the first user or a second user operates the first application, allowing the first application to access the first application resource library; and Creating a second application resource library, and when the first user or the second user operates the second application, allowing the second application to access the second application resource library.

In another aspect, the invention provides a computing system, which comprises: a memory and a processor which are in communication connection, as well as a computer program which is stored in the memory and is able to run on the processor, wherein the resource management method is implemented when the computer program runs on the processor.

In another aspect, the invention provides a resource management method, which comprises:

Creating a first user application resource library, and when a first user operates a first application, allowing the first application to access the first user application resource library;

Creating a second user application resource library, and when a second user operates the first application, allowing the first application to access the second user application resource library; and In response to a management operation performed by the first user on resources in the first user application resource library, directly or indirectly transmitting the resources in the first application resource library to the second user application resource library.

Preferably, in response to a management operation performed by the first user on resources in the first user application resource library, directly or indirectly transmitting the resources in the first user application resource library to the second user application resource library specifically comprises:

In response to a management operation performed by the first user on resources in the first user application resource library, transmitting the resources in the first user application resource library to a second user resource library; in response to a management operation performed by the second user on resources in the second user resource library, transmitting at least part of resources received from the first user application resource library by the second user resource library to the second user application resource library;

Or, in response to a management operation performed by the first user on resources in the first user application resource library, transmitting the resources in the first user application resource library to a first user resource library; in response to a management operation performed by the first user on resources in the first user resource library, transmitting at least part of resources received from the first user application resource library by the first user resource library to a second user resource library; in response to a management operation performed by the second user on resources in the second user resource library, transmitting at least part of resources received from the first user resource library by the second user resource library to the second user application resource library; and Storing resources associated with the first user in the first user resource library to allow the first user to access the resources, and storing resources associated with the second user in the second user resource library to allow the second user to access the resources.

Preferably, the first user application resource library is created before the first user operates the first application, and is deleted after the first user finishes operating the first application; and the second user application resource library is created before the second user operates the first application, and is deleted after the second user finishes operating the first application.

In another aspect, the invention provides a computing system, which comprises: a memory and a processor which are in communication connection, as well as a computer program which is stored in the memory and is able to run on the processor, wherein the resource management method is implemented when the computer program runs on the processor.

In another aspect, the invention provides a resource management method, which comprises:

Creating a first user application resource library, and when a first user operates a first application, allowing the first application to access the first user application resource library;

Creating a fourth user application resource library, and when a second user operates a second application, allowing the second application to access the fourth user application resource library; and In response to a management operation performed by the first user on resources in the first user application resource library, directly or indirectly transmitting the resources in the first user application resource library to the fourth user application resource library.

Preferably, in response to a management operation performed by the first user on resources in the first user application resource library, directly or indirectly transmitting the resources in the first user application resource library to the fourth user application resource library specifically comprises:

In response to a management operation performed by the first user on resources in the first user application resource library, transmitting the resources in the first user application resource library to a second user resource library; in response to a management operation performed by the second user on resources in the second user resource library, transmitting at least part of resources received from the first user application resource library by the second user resource library to the fourth user application resource library;

Or, in response to a management operation performed by the second user on resources in the first user application resource library, transmitting the resources in the first user application resource library to a first user resource library; in response to a management operation performed by the first user on resources in the first user resource library, transmitting at least part of resources received from the first user application resource library by the first user resource library to a second user resource library; in response to a management operation performed by the second user on resources in the second user resource library, transmitting at least part of resources received from the first user resource library by the second user resource library to the fourth user application resource library; and Storing resources associated with the first user in the first user resource library to allow the first user to access the resources, and storing resources associated with the second user in the second user resource library to allow the second user to access the resources.

Preferably, the first user application resource library is created before the first user operates the first application, and is deleted after the first user finishes operating the first application; and the fourth application resource library is created before the second user operates the second application, and is deleted after the second user finishes operating the second application.

In another aspect, the invention provides a computing system, which comprises: a memory and a processor which are in communication connection, as well as a computer program which is stored in the memory and is able to run on the processor, wherein the resource management method is implemented when the computer program runs on the processor.

The invention has the following beneficial effects:
1. A user application resource library exclusively used by a user to operate an application is created according to the application operated by the user (the application can access the user application resource library only when the application is operated by the user), such that resources can be isolated when the same user operates different applications, and resources can also be isolated when different users operates the same or different applications; moreover, in response to a management operation performed by the user on resources in the user application resource library, the resources in the user application resource library can be shared by other user application resource libraries, such that resource sharing is realized, and resource management is facilitated.
2. Resources are shared in response to an operation performed by the user (whether to share resources can be shared is determined by the user), and even if viruses exist in the created user application resource library, the viruses will not spread into other resource libraries (including user resource libraries and other user application resource libraries) as long as the user does not perform a resource sharing operation, so the security is better.
3. The user application resource library is deleted after the user finishes operating the application, so even if viruses are implanted into the user application resource library, the viruses will be cleared in time and will not spread into other resource libraries.

DETAILED DESCRIPTION OF THE INVENTION

To better clarify the purposes, technical solutions and advantages of the embodiments of the invention, the technical solutions of the embodiments of the invention will be clearly and completely described. Obviously, the embodiments in the following description are merely illustrative ones, and are not all possible ones of the invention. All other embodiments obtained by those ordinarily skilled in the art without creative labor should also fall within the protection scope of the invention.

To facilitate reading and understanding, "first user application resource library", "second user application resource library", "third user application resource library", "fourth user application resource library", "first user resource library", "second user resource library", "first application resource library" and "second application resource library" mentioned in the invention are defined as follows: "first user application resource library", "second user application resource library", "third user application resource library" and "fourth user application resource library" are catalogues created on a computer system by a resource management program, are used for storing data, and are mutually independent and managed separately; "first user source library" stores resources associated with a first user, such that the first user can access the resources; "second user resource library" stores resources associated with a second user, such that the second user can access the resources; "first application resource library" stores resources associated with a first application, such that the first application can access the resources; and "second application resource library" stores resources associated with a second application, such that the second application can access the resources.

In the embodiments illustrated below, a user application resource library exclusively used by a user to operate an application is created according to the application operated by the user, that is, the user application resource library is created according to the user and the application, and the application can access the user application resource library only when the application is operated by the user, such that resources are isolated when the same user operates different applications. Moreover, in response to a management operation performed by the user on resources in the user application resource library, the resources in the user application resource library can be shared by other user application resource libraries (all user application resource libraries are mutually independent), such that resource sharing is realized, and resource management is facilitated.

Figure 1:
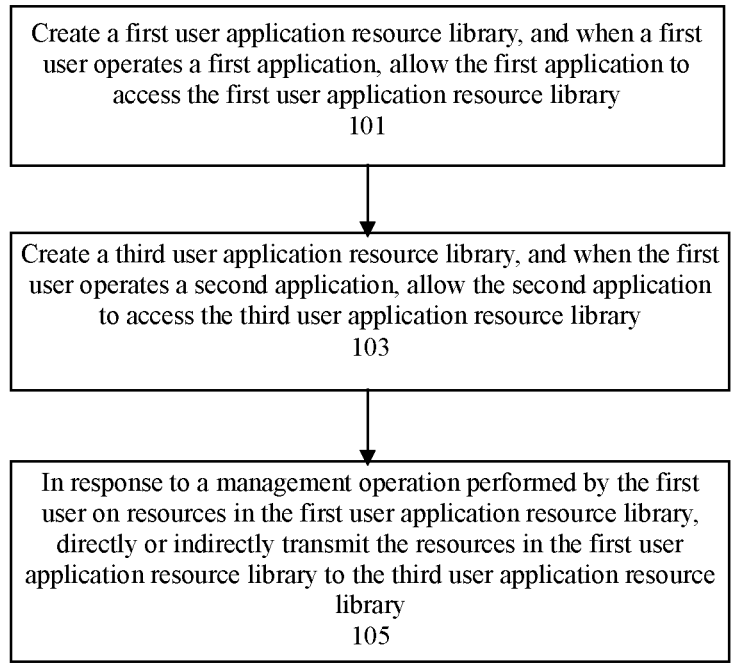
FIG. 1 is a flow diagram of a resource management method according to the invention.
Figure 4:
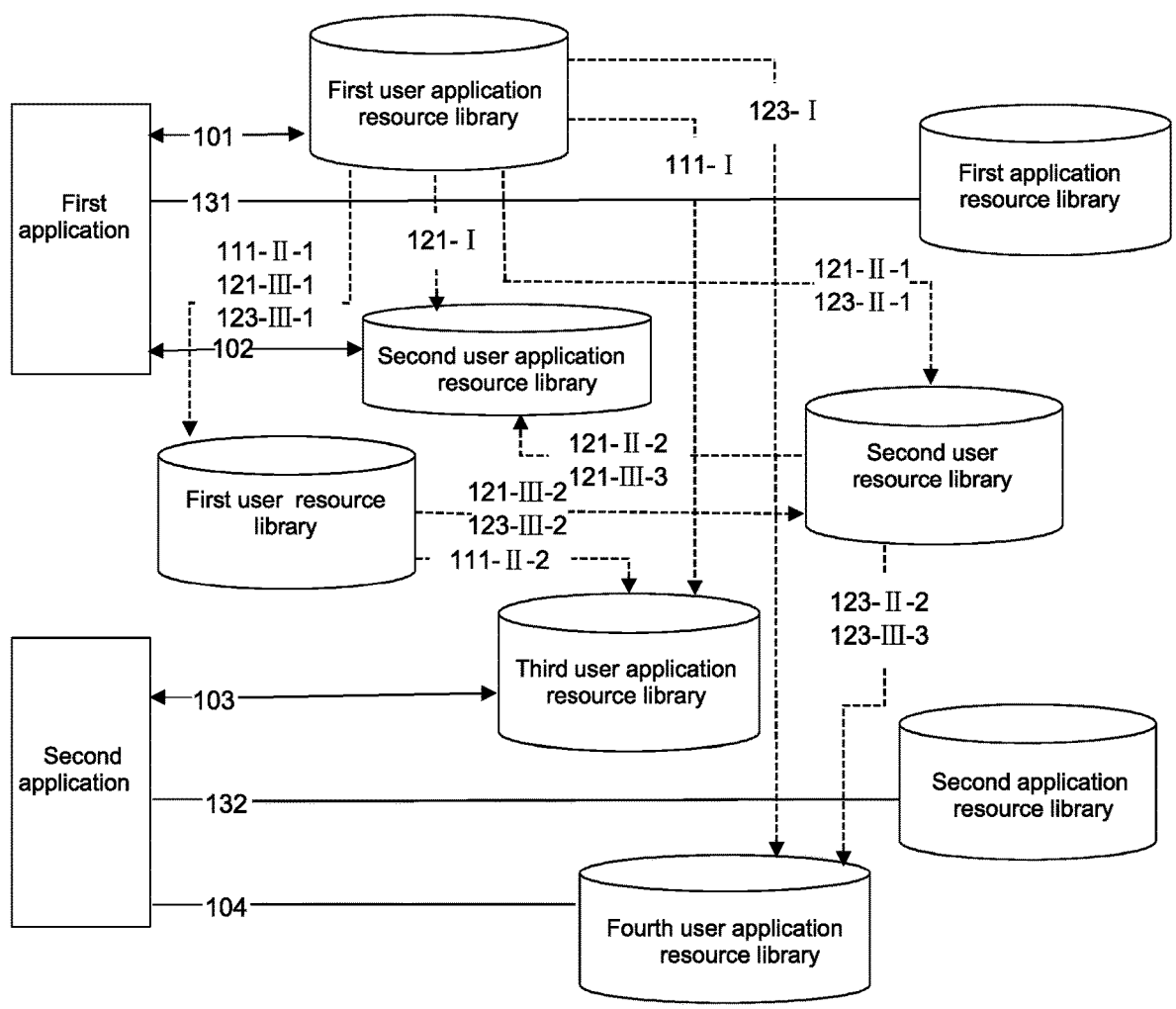
FIG. 4 is a schematic diagram of a system obtained through the resource management method according to the invention.

As shown in FIG. 1 and FIG. 4, a resource management method comprises:

101: a first user application resource library is created, and when a first user operates a first application, the first application accesses the first user application resource library. Specifically, the first user application resource library is created before the first user operates the first application, and the first application can access the first user application resource library only when the first user operates the first application; and the first user can perform a management operation, such as uploading, downloading, deleting, renaming, copying, moving, or sharing, on resources in the first user application resource library.

103: a third user application resource library is created, and when the first user operates a second application, the second application accesses the third user application resource library. Specifically, the third user application resource library is created before the first user operates the second application, and the second application can access the third user application resource library only when the first user operates the second application; and the first user can perform a management operation, such as uploading, downloading, deleting, renaming, copying, moving, or sharing, on resources in the third user application resource library.

105: in response to a management operation performed by the first user on resources in the first user application resource library, the resources in the first user application resource library are transmitted to the third user application resource library. The resources in the first user application resource library are directly transmitted to the third user application resource library (111-I); or, the resources in the first user application resource library are indirectly transmitted to the third user application resource library. Specifically, in response to a management operation performed by the first user on resources in the first user application resource library, the resources in the first user application resource library are transmitted to a first user resource library (111-II-1); in response to a management operation (such as uploading, downloading, deleting, renaming, copying, moving, or sharing) performed by the first user on resources in the first user resource library, at least part of resources received from the first user application resource library by the first user resource library are transmitted to the third user application resource library (111-II-2).

In this way, the first user application resource library and the third user application resource library which are independent of each other are created and are accessed when the first user operates the first application and the second application respectively, such that resources are mutually isolated, and conflicts, leakages, virus infections and other technical problems caused by resource sharing in the prior art are effectively avoided. In addition, the first user can perform a management operation on the resources in the first user application resources to transmit the resources in the first user application resource library to the third user application resource library, such that resource sharing between different applications operated by the same user is realized, resource management is facilitated, and a system is more flexible. Moreover, although 101 is performed before 103 in the flow diagram illustrated by FIG. 1, those skilled in the art should appreciate that the change of the execution order of 101 and 103 has no influence on the result and will not produce any technical effects. Therefore, although the execution order of the steps is defined in this embodiment, the solution that 103 is performed first, then 101 is performed and finally 105 is performed is not excluded from the protection scope of the invention.

Further, the first user application resource library is deleted after the first user finishes operating the first application, such that even if viruses are implanted into the first user application resource library, these viruses will be cleared in time and will not spread into other resource libraries (including the second user application resource library, the third user application resource library, the fourth user application resource library, the first user resource library, the second user resource library, the first application resource library and the second application resource library), thus further improving the security. Similarly, the third user application resource library is deleted after the first user finishes operating the second application.

For the sake of a good understanding, the invention is described below with an example:

User 1 (corresponding to the first user) creates a file in a jpg format through application B (corresponding to the first application, such as Photoshop), and then inserts the file in the jpg format into application C (corresponding to the second application, such as Microsoft Office PowerPoint) to make a PPT file.

According to an existing technical solution, user 1 creates a file in a jpg format by operating Photoshop, stores the file in the jpg format in a resource library (such as desktop) that can be accessed by both Photoshop and Microsoft Office PowerPoint, and inserts the file in the jpg format by operating Microsoft Office PowerPoint, to make a PPT file. The two applications share one resource library, so resources cannot be mutually isolated, conflicts, leakages and virus infections occur easily, and the security cannot be guaranteed.

According to the technical solution of this embodiment, user 1 creates a user 1 application B resource library (corresponding to the first user application resource library) before operating Photoshop; then, user 1 operates Photoshop to make a file in a jpg format and stores the file in the jpg format in the user 1 application B resource library; user 1 creates a user 1 application C resource library (corresponding to the third user application resource library) before operating Microsoft Office PowerPoint; in response to a management operation performed by user 1 on resources in the user 1 application B resource library, the file in the jpg format in the user 1 application B resource library is transmitted to the third user application resource library; then, user 1 accesses the file in the jpg format by operating Microsoft Office PowerPoint, to make a PPT file. The user 1 application B resource library and the user 1 application C resource library are independent of each other, such that resources are mutually isolated, conflicts, leakages, virus infections and other technical problems caused by resource sharing in the prior art are effectively avoided, and the security is better.

As a preferred implementation of this embodiment, to further improve the flexibility, the resource management method further comprises:

A second user application resource library is created, and when a second user operates the first application, the first application accesses the second user application resource library (102). Specifically, the second user application resource library is created before the first user operates the second application, and the second application can access the second user application resource library only when the first user operates the second application; moreover, the first user can perform a management operation, such as uploading, downloading, deleting, renaming, copying, moving, or sharing, on resources in the second user application resource library.

In response to a management operation performed by the first user on resources in the first user application resource library, the resources in the first user application resource library are transmitted to the second user application resource library. The resources in the first user application resource library are directly transmitted to the second user application resource library (121-I); or, the resources in the first user application resource library are indirectly transmitted to the second user application resource library. Specifically, in response to a management operation performed by the first user on resources in the first user application resource library, the resources in the first user application resource library are transmitted to a second user resource library (121-II-1); and in response to a management operation (such as uploading, downloading, deleting, renaming, copying, moving, or sharing) performed by the second user on resources in the second user resource library, at least part of resources received from the first user application resource library by the second user resource library are transmitted to the second user application resource library (121-II-2); or, in response to a management operation performed by the first user on resources in the first user application resource library, the resources in the first user application resource library are transmitted to a first user resource library (121-III-1); in response to a management operation performed by the first user on resources in the first user resource library, at least part of resources received from the first user application resource library by the first user resource library are transmitted to a second user resource library (121-III-2); and in response to a management operation performed by the second user on resources in the second user resource library, at least part of resources received from the first user resource library by the second user resource library are transmitted to the second user application resource library (121-III-3).

In this way, the second user application resource library independent of the first user application resource library is created, and is accessed when the second user operates the first application, and the first user performs a management operation on resources in the first user application resource library to transmit the resources in the first user application resource library to the second user application resource library, and different users use respective resources when one application is used by multiple users, such that resources used by different users are isolated and can be shared, that is, resource isolation is realized and resources can be shared by different users operating the same application, and the flexibility is further improved.

Further, the second user application resource library is deleted after the second user finishes operating the first application, such that even if viruses are implanted into the second user application resource library, these viruses will be cleared in time and will not spread into other resource libraries (including the first user application resource library, the third user application resource library, the fourth user application resource library, the first user resource library, the second user resource library, the first application resource library and the second application resource library), thus further improving the security.

As another preferred implementation of this embodiment, to further improve the flexibility, the resource management method further comprises:

A fourth user application resource library is created, when the second user operates the second application, the second application accesses the fourth user application resource library (104). Specifically, the fourth user application resource library is created before the second user operates the second application, and the second application can access the fourth user application resource library only when the second user operates the second application; moreover, the second user can perform a management operation, such as uploading, downloading, deleting, renaming, copying, moving, or sharing, on resources in the second user application resource library.

In response to a management operation performed by the first user on resources in the first user application resource library, the resources in the first user application resource library are transmitted to the fourth user application resource library. The resources in the first user application resource library are directly transmitted to the fourth user application resource library (123-I); or, the resources in the first user application resource library are indirectly transmitted to the fourth user application resource library. Specifically, in response to a management operation performed by the first user on resources in the first user application resource library, the resources in the first user application resource library are transmitted to a second user resource library (123-II-1); and in response to a management operation performed by the second user on resources in the second user resource library, at least part of resources received from the first user application resource library by the second user resource library are transmitted to the fourth user application resource library (123-II-2); or, in response to a management operation performed by the first user on resources in the first user application resource library, the resources in the first user application resource library are transmitted to a first user resource library (123-III-1); in response to a management operation performed by the first user on resources in the first user resource library, at least part of resources received from the first user application resource library by the first user resource library are transmitted to a second user resource library (123-III-2); and in response to a management operation performed by the second user on resources in the second user resource library, at least part of resources received from the first user source library by the second user resource library are transmitted to the fourth user application resource library (123-III-3).

In this way, the fourth user application resource library independent of the first user application resource library is created, and is accessed when the second user operates the second application, and the first user performs a management operation on resources in the first user application resource library to transmit the resources in the first user application resource library to the four user application resource library, such that resources are shared by different users operating different applications, and the flexibility is further improved.

Further, the fourth user application resource library is deleted after the second user finishes operating the second application, such that even if viruses are implanted into the fourth user application resource library, these viruses will be cleared in time and will not spread into other resource libraries (including the first user application resource library, the second user application resource library, the third user application resource library, the first user resource library, the second user resource library, the first application resource library and the second application resource library), thus further improving the security.

As another preferred implementation of this embodiment, the resource management method further comprises:

A first application resource library is created, and when the first user or the second user operates the first application, the first application accesses the first application resource library (131); and A second application resource library is created, and when the first user or the second user operates the second application, the second application accesses the second application resource library (132).

A system shown in FIG. 4 is obtained through the above resource management method. The system comprises the first user application resource library, the second user application resource library, the third user application resource library, the fourth user application resource library, the first user resource library, the second user resource library, the first application resource library, and the second application resource library.

When the first user operates the first application, resources in the first user application resource library may be transmitted to the first user resource library, and resources in the first user resource library may also be transmitted to the first user application resource library. When the first user operates the second application, resources in the third user application resource library may be transmitted to the first user resource library, and resources in the first user resource library may also be transmitted to the third user application resource library. When the second user operates the first application, resources in the second user application resource library may be transmitted to the second user resource library, and resources in the second user resource library may also be transmitted to the second user application resource library. When the second user operates the second application, resources in the fourth user application resource library may be transmitted to the second user resource library, and resources in the second user resource library may also be transmitted to the fourth user application resource library. The first user can perform a management operation, such as uploading, downloading, deleting, renaming, copying, moving, or sharing, on the resources in the first user resource library and the resources in the first user application resource library; and the second user can perform a management operation, such as uploading, downloading, deleting, renaming, copying, moving, or sharing, on the resources in the second user resource library or the resources in the second user application resource library. The first user can share the resources in the first user resource library into the second user resource library, and the second user can share the resources in the second user resource library into the first user resource library.

A computing system may be a single device, system or facility, or be implemented as multiple distributed devices, systems and facilities. Specifically, the computing system comprises a memory and a processor which are in communication connection, as well as a computer program which is stored in the memory and is able to run on the processor, and when the computer program runs on the processor, the resource management method is implemented.

Figure 5:
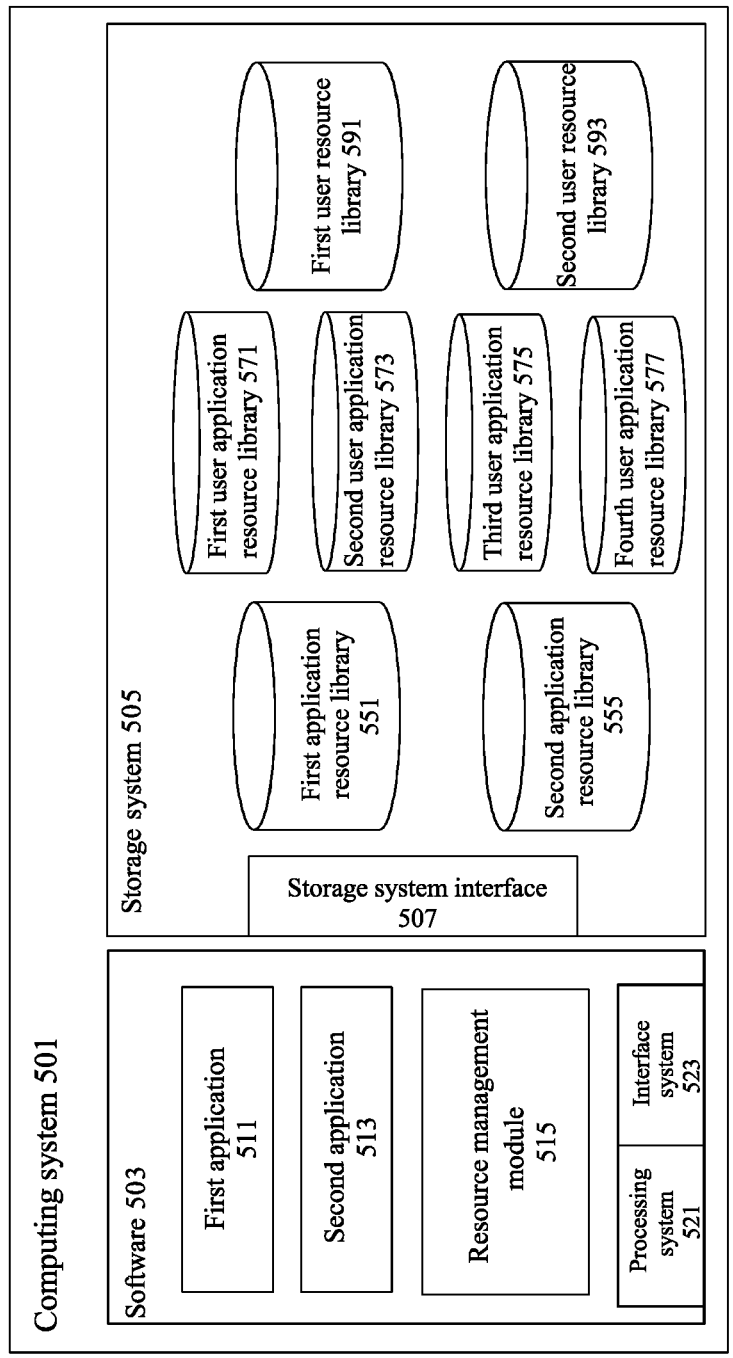
FIG. 5 is a block diagram of a computing system according to the invention.

As shown in FIG. 5, a computing system 501 comprises software 503 and a storage system 505, wherein the software 503 comprises a first application 511, a second application 513, a resource management module 515, a processing system 521, and an interface system 523; and the storage system 505 comprises a storage system interface 507, a first application resource library 551, a second application resource library 555, a first user application resource library 571, a second user application resource library 573, a third user application resource library 575, a fourth user application resource library 577, a first user resource library 591, and a second user resource library 593.

The steps of the resource management method of the invention are performed by the source management module 515. Access to and operation on the resource libraries are realized through the storage system interface 507. Specifically, the first application can access the related application resource library (the first application resource library 551) and the related user application resource libraries (the first user application resource library 571 and the second user application resource library 573) through the storage system interface 507, and the second application can access the related application resource library (the second application resource library 555) and the related user application resource libraries (the third user application resource library 575 and the fourth user application resource library 577) through the storage system interface 507; users operate related resource libraries by means of the resource management module 515 through the storage system interface 507 (for example, in response to a management operation performed by the first user on resources in the first user application resource library, the resources in the first user application resource library are transmitted to the third user application resource library, specifically: in response to an operation performed by the first user, the resource management module 515 performs a management operation on the resources in the first user application resource library, the resources in the first user application resource library are transmitted to the third user application resource library). Operations performed by users on the related applications and resource libraries are realized through the interface system 523. The processing system 521 provides a basic system environment and dispatches system resources to perform relevant operations.

In another example of the invention, a user application resource library is created according to a user and an application, and the application can access the user application resource library only when the application is operated by the user, such that resources are isolated when the same user operates different applications. Moreover, in response to a management operation performed by the user on resources in the user application resource library, the resources in the user application resource library can be shared by other user application resource libraries (all the user application resource libraries are mutually independent), such that resource sharing is realized, and resource management is facilitated.

Figure 2:
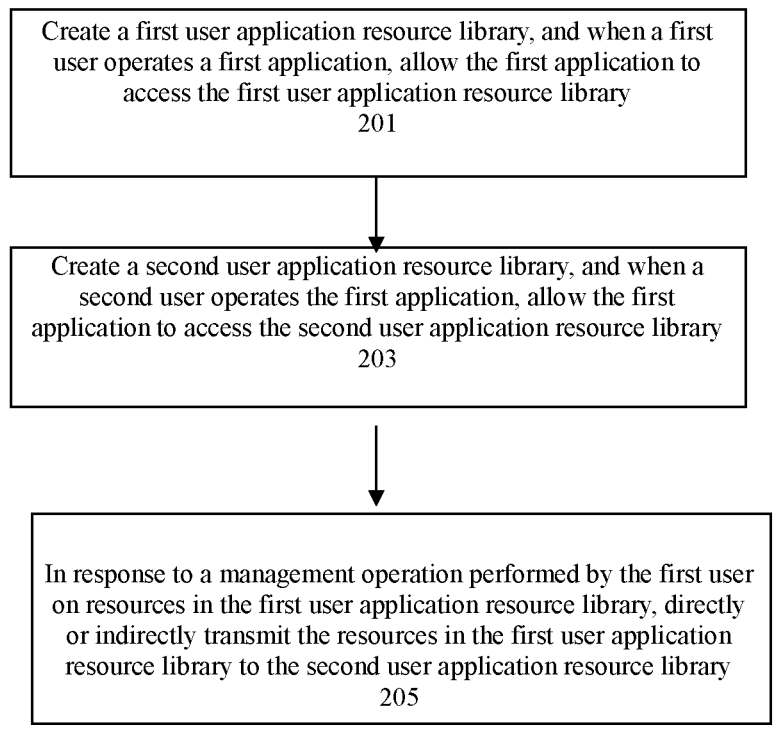
FIG. 2 is flow diagram of another resource management method according to the invention.

As shown in FIG. 2, a resource management method comprises:

201: a first user application resource library is created, and when a first user operates a first application, the first application accesses the first user application resource library. The specific implementation of this step is the same as mentioned above, and will not be detailed here.

103: a second user application resource library is created, and when a second user operates the first application, the first application accesses the second user application resource library. The specific implementation of this step is the same as mentioned above, and will not be detailed here.

205: in response to a management operation performed by the first user on resources in the first user application resource library, resources in the first user application resource library are transmitted to the second user application resource library. The specific implementation of this step is as mentioned above, and will not be detailed here.

In this way, the first user application resource library and the third user application resource library which are independent of each other are created and are accessed when the first user and the second user operate the first application respectively; meanwhile, the first user performs a management operation on resources in the first user application resource library to transmit the resources in the first user application resource library to the second user application resource library, and different users use respective resources when one application is used by multiple users, such that resources used by different users are isolated and can be shared, that is, resource isolation is realized and resources can be shared by different users operating the same application, and the flexibility is further improved. Similarly, although 201 is performed before 203 in the flow diagram illustrated by FIG. 2, those skilled in the art should appreciate that the change of the execution order of 201 and 203 has no influence on the result and will not produce any technical effects. Therefore, although the execution order of the steps is defined in this embodiment, the solution that 203 is performed first, then 201 is performed and finally 205 is performed is not excluded from the protection scope of the invention.

Further, the first user application resource library is deleted after the first user finishes operating the first application, such that even if viruses are implanted into the first user application resource library, these viruses will be cleared in time and will not spread into other resource libraries (including the second user application resource library, the third user application resource library, the fourth user application resource library, the first user resource library, the second user resource library, the first application resource library and the second application resource library), thus further improving the security. Similarly, the second user application resource library is deleted after the second user finishes operating the first application.

A computing system may be a single device, system or facility, or be implemented as multiple distributed devices, systems and facilities. Specifically, the computing system comprises a memory and a processor which are in communication connection, as well as a computer program which is stored in the memory and is able to run on the processor, and when the computer program runs on the processor, the resource management method is implemented, and resources are isolated and can be shared by different users operating the same application. The specific structure of the computing system is as mentioned above, and will not be detailed here.

In another example of the invention, a user application resource library is created according to a user and an application, and the application can access the user application resource library only when the application is operated by the user, such that resources are isolated when different users operate different applications. Moreover, in response to a management operation performed by the user on resources in the user application resource library, the resources in the user application resource library can be shared by other user application resource libraries (all the user application resource libraries are mutually independent), such that resource sharing is realized, and resource management is facilitated.

Figure 3:
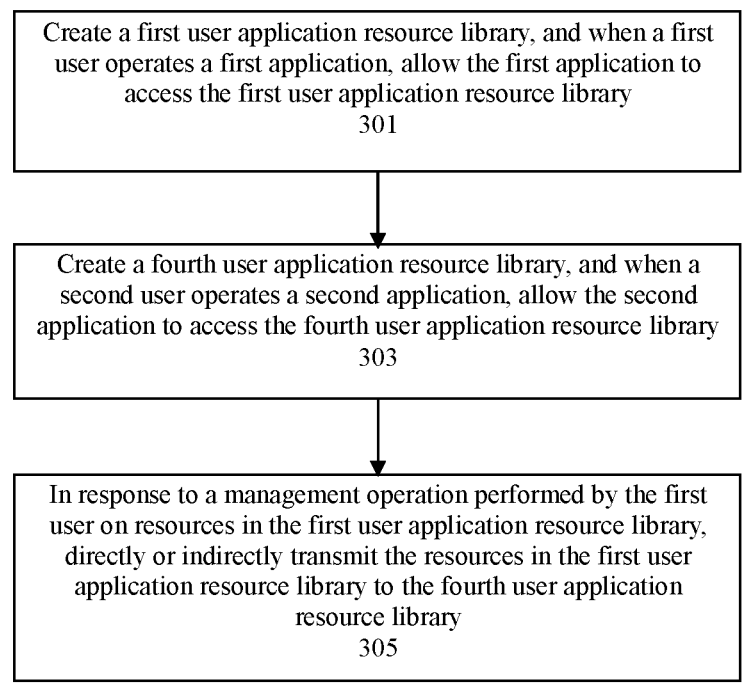
FIG. 3 is a flow diagram of another resource management method according to the invention.

As shown in FIG. 3, a source management method comprises:

301: a first user application resource library is created, and when a first user operates a first application, the first application accesses the first user application resource library. The specific implementation of this step is as mentioned above, and will not be detailed here.

303, a fourth user application resource library is created, and when a second user operates a second application, the second application accesses the fourth user application resource library. The specific implementation of this step is as mentioned above, and will not be detailed here.

305, in response to a management operation performed by the first user on resources in the first user application resource library, the resources in the first user application resource library are directly or indirectly transmitted to the fourth user application resource library. The specific implementation of this step is as mentioned above, and will not be detailed here.

In this way, the first user application resource library and the fourth user application resource library which are independent of each other are created and are accessed when the first user operates the first application and the second user operates the second application respectively, and the first user can perform a management operation on the resources in the first user application resources to transmit the resources in the first user application resource library to the fourth user application resource library, such that resource sharing between different applications operated by different users is realized, and the flexibility is better. Similarly, although 301 is performed before 303 in the flow diagram illustrated by FIG. 3, those skilled in the art should appreciate that the change of the execution order of 301 and 303 has no influence on the result and will not produce any technical effects. Therefore, although the execution order of the steps is defined in this embodiment, the solution that 303 is performed first, then 301 is performed and finally 305 is performed is not excluded from the protection scope of the invention.

Further, the first user application resource library is deleted after the first user finishes operating the first application, such that even if viruses are implanted into the first user application resource library, these viruses will be cleared in time and will not spread into other resource libraries (including the second user application resource library, the third user application resource library, the fourth user application resource library, the first user resource library, the second user resource library, the first application resource library and the second application resource library), thus further improving the security. Similarly, the second user application resource library is deleted after the second user finishes operating the second application.

A computing system may be a single device, system or facility, or be implemented as multiple distributed devices, systems and facilities. Specifically, the computing system comprises a memory and a processor which are in communication connection, as well as a computer program which is stored in the memory and is able to run on the processor, and when the computer program runs on the processor, the resource management method is implemented, and resources are isolated and can be shared by different users operating different applications. The specific structure of the computing system is as mentioned above, and will not be detailed here.

The computing system described above represents any system or system combination capable of realizing various applications, services, scenes and processes disclosed in this specification. For example, the computing system may be a server computer, or any other types of computing systems (or a combination of the computing systems) suitable for performing enhanced collaborative operations described in this specification. The system may adopt one or more virtual machines, containers, or any other types of virtual computing resources supporting enhanced and grouped collaboration.

The above embodiments are described by way of examples to assist in understanding the solution of the invention, and are not intended to limit the invention. Although the invention has been described in detail with reference to the above embodiments, those ordinarily skilled in the art should understand that the technical solutions of the above embodiments can still be amended, or part of technical features in the above embodiments can be equivalently substituted, without making the essence of corresponding technical solutions depart from the scope of the technical solutions of the embodiments of the invention.

What is claimed is:

1. A resource management method to isolate and share resource among different users and among different applications using user application resource libraries and user resource libraries, comprising:
   creating a first user application resource library, and when a first user operates a first application, allowing the first application to access the first user application resource library;
   creating a second user application resource library, and when a second user operates the first application, allowing the first application to access the second user application resource library; and
   directly or indirectly transmitting the resources in the first user application resource library to the second user application resource library;
   wherein directly or indirectly transmitting the resources in the first user application resource library to the second user application resource library specifically comprises:
   in response to a management operation performed by the first user on resources in the first user application resource library, transmitting the resources in the first user application resource library to a second user resource library: in response to a management operation performed by the second user on resources in the second user resource library, transmitting at least part of resources received from the first user application resource library by the second user resource library to the second user application resource library;
   or, in response to a management operation performed by the first user on resources in the first user application resource library, transmitting the resources in the first user application resource library to a first user resource library; in response to a management operation performed by the first user on resources in the first user resource library, transmitting at least part of resources received from the first user application resource library by the first user resource library to a second user resource library: in response to a management operation performed by the second user on resources in the second user resource library, transmitting at least part of resources received from the first user resource library by the second user resource library to the second user application resource library; and
   storing resources associated with the first user in the first user resource library to allow the first user to access the resources, and storing resources associated with the second user in the second user resource library to allow the second user to access the resources.

2. The resource management method according to claim 1, wherein the first user application resource library is created before the first user operates the first application, and is deleted after the first user finishes operating the first application.

3. The resource management method according to claim 1, wherein the second user application resource library is created before the second user operates the first application, and is deleted after the second user finishes operating the first application.

4. The resource management method according to claim 1, wherein the resource management method further comprises:
   creating a fourth user application resource library, and when a second user operates the second application, allowing the second application to access the fourth user application resource library; and
   in response to the management operation performed by the first user on resources in the first user application resource library, directly or indirectly transmitting the resources in the first user application resource library to the fourth user application resource library.

5. The resource management method according to claim 4, wherein in response to the management operation performed by the first user on resources in the first user application resource library, directly or indirectly transmitting the resources in the first user application resource library to the fourth user application resource library specifically comprises:
   in response to the management operation performed by the first user on resources in the first user application resource library, transmitting the resources in the first user application resource library to a second user resource library; in response to a management operation performed by the second user on the second user resource library, transmitting at least part of resources received from the first user application resource library by the second user resource library to the fourth user application resource library;
   or, in response to the management operation performed by the first user on resources in the first user application resource library, transmitting the resources in the first user application resource library to a first user resource library; in response to the management operation performed by the first user on resources in the first user resource library, transmitting at least part of resources received from the first user application resource library by the first user resource library to a second user resource library; in response to a management operation performed by the second user on the second user resource library, transmitting at least part of resources received from the first user resource library by the second user resource library to the fourth user application resource library; and
   storing resources associated with the first user in the first user resource library to allow the first user to access the resources, and storing resources associated with the second user in the second user resource library to allow the second user to access the resources.

6. The resource management method according to claim 4, wherein the fourth user application resource library is created before the second user operates the second application, and is deleted after the second user finishes operating the second application.

7. The resource management method according to claim 1, wherein the management method further comprises:
   creating a first application resource library, and when the first user or a second user operates the first application, allowing the first application to access the first application resource library; and creating a second application resource library, and when the first user or the second user operates the second application, allowing the second application to access the second application resource library.

8. A computing system, comprising: a memory and a processor which are in communication connection, as well as a computer program which is stored in the memory and is able to run on the processor, wherein the resource management method according to claim 1 is implemented when the computer program runs on the processor.

9. A resource management method to isolate and share resource among different users and among different applications using user application resource libraries and user resource libraries, comprising creating a first user application resource library, and when a first user operates a first application, allowing the first application to access the first user application resource library;

creating a fourth user application resource library, and when a second user operates a second application, allowing the second application to access the fourth user application resource library; and in response to a management operation performed by the first user on resources in the first user application resource library, directly or indirectly transmitting the resources in the first user application resource library to the fourth user application resource library;

wherein the first user application resource library is independent of a first user resource library and the fourth user application resource library is independent of a second user resource library; wherein resources associated with the first user are stored in the first user resource library for access by the first user; wherein resources associated with the second user are stored in the second user resource library for access by the second user;

wherein, in response to the management operation performed by the first user on resources in the first user application resource library, directly or indirectly transmitting the resources in the first user application resource library to the fourth user application resource library specifically comprises:

in response to the management operation performed by the first user on resources in the first user application resource library, transmitting the resources in the first user application resource library to the second user resource library; in response to a management operation performed by the second user on resources in the second user resource library, transmitting at least part of resources received from the first user application resource library by the second user resource library to the fourth user application resource library;

or, in response to the management operation performed by the first user on resources in the first user application resource library, transmitting the resources in the first user application resource library to a first user resource library: in response to a management operation performed by the first user on resources in the first user resource library, transmitting at least part of resources received from the first user application resource library by the first user resource library to the second user resource library: in response to a management operation performed by the second user on resources in the second user resource library, transmitting at least part of resources received from the first user resource library by the second user resource library to the fourth user application resource library; and storing resources associated with the first user in the first user resource library to allow the first user to access the resources, and storing resources associated with the second user in the second user resource library to allow the second user to access the resources.

10. The resource management method according to claim 9, wherein the first user application resource library is created before the first user operates the first application, and is deleted after the first user finishes operating the first application; and the fourth application resource library is created before the second user operates the second application, and is deleted after the second user finishes operating the second application.

11. The resource management method according to claim 1, further comprising:

creating a third user application resource library, and when the first user operates a second application, allowing the second application to access the third user application resource library; and in response to another management operation performed by the first user on resources in the first user application resource library, directly or indirectly transmitting the resources in the first user application resource library to the third user application resource library;

wherein in response to said another management operation performed by the first user on resources in the first user application resource library, directly or indirectly transmitting the resources in the first user application resource library to the third user application resource library specifically comprises:

in response to the management operation performed by the first user on resources in the first user application resource library, transmitting the resources in the first user application resource library to a first user resource library: in response to a management operation performed by the first user on resources in the first user resource library, transmitting at least part of the resources received from the first user application resource library by the first user resource library to the third user application resource library.

12. The resource management method according to claim 11, wherein the third user application resource library is created before the first user operates the second application, and is deleted after the first user finishes operating the second application.

* * * * *